United States Patent
Davis et al.

(10) Patent No.: US 9,551,803 B2
(45) Date of Patent: Jan. 24, 2017

(54) GEOLOGICAL MEDIUM EXPLORATION

(71) Applicant: COLORADO SCHOOL OF MINES, Golden, CO (US)

(72) Inventors: Thomas Leonard Davis, Golden, CO (US); Halina Jedrzejowska-Tyczkowska, Cracow (PL); Krystyna Zukowska, Cracow (PL); Irena Irlik, Cracow (PL)

(73) Assignee: Colorado School of Mines, Golden, CO (US)

( * ) Notice: Subject to any disclaimer, the term of this patent is extended or adjusted under 35 U.S.C. 154(b) by 436 days.

(21) Appl. No.: 13/756,119

(22) Filed: Jan. 31, 2013

(65) Prior Publication Data

US 2013/0235694 A1    Sep. 12, 2013

Related U.S. Application Data

(60) Provisional application No. 61/593,096, filed on Jan. 31, 2012.

(51) Int. Cl.
*G01V 1/30* (2006.01)
*G01V 1/40* (2006.01)

(52) U.S. Cl.
CPC . *G01V 1/40* (2013.01); *G01V 1/30* (2013.01); *G01V 2210/50* (2013.01); *G01V 2210/58* (2013.01); *G01V 2210/677* (2013.01)

(58) Field of Classification Search
CPC .............. G01V 1/28; G01V 1/30; G01V 1/40; G01V 2210/50; G01V 2210/58; G01V 2210/59; G01V 2210/677

USPC .......................................................... 367/57
See application file for complete search history.

(56) References Cited

U.S. PATENT DOCUMENTS

| | | | | |
|---|---|---|---|---|
| 2,718,930 A | * | 9/1955 | Bazhaw | 367/57 |
| 4,214,226 A | * | 7/1980 | Narasimhan et al. | 367/27 |
| 4,899,321 A | * | 2/1990 | Solanki | 367/48 |
| 5,105,391 A | * | 4/1992 | Rice et al. | 367/57 |
| 2007/0064532 A1 | * | 3/2007 | Haldorsen | G01V 1/37 367/57 |
| 2007/0294036 A1 | | 12/2007 | Strack et al. | |
| 2009/0097356 A1 | * | 4/2009 | Haldorsen | G01V 1/42 367/24 |
| 2009/0175126 A1 | * | 7/2009 | Lambert et al. | 367/59 |
| 2009/0299637 A1 | * | 12/2009 | Dasgupta | G01V 1/008 702/12 |
| 2010/0139927 A1 | | 6/2010 | Bakulin et al. | |
| 2010/0270026 A1 | | 10/2010 | Lazaratos et al. | |

OTHER PUBLICATIONS

"PCT International Search Report and Written Opinion dated May 20, 2013", PCT Application No. PCT/US13/24192, 6 pages.

* cited by examiner

*Primary Examiner* — Ian J Lobo
(74) *Attorney, Agent, or Firm* — Dorsey & Whitney LLP

(57) ABSTRACT

Systems and methods for geological medium exploration are provided herein. A method of geological medium exploration may include generating vibrations in a geological medium and recording wave-fields at a surface and in a borehole. Additionally, the method may include obtaining a wave field modification operator and applying the wave-field operator to a full range of seismic data to achieve a spectrally-modified wave field.

15 Claims, 22 Drawing Sheets

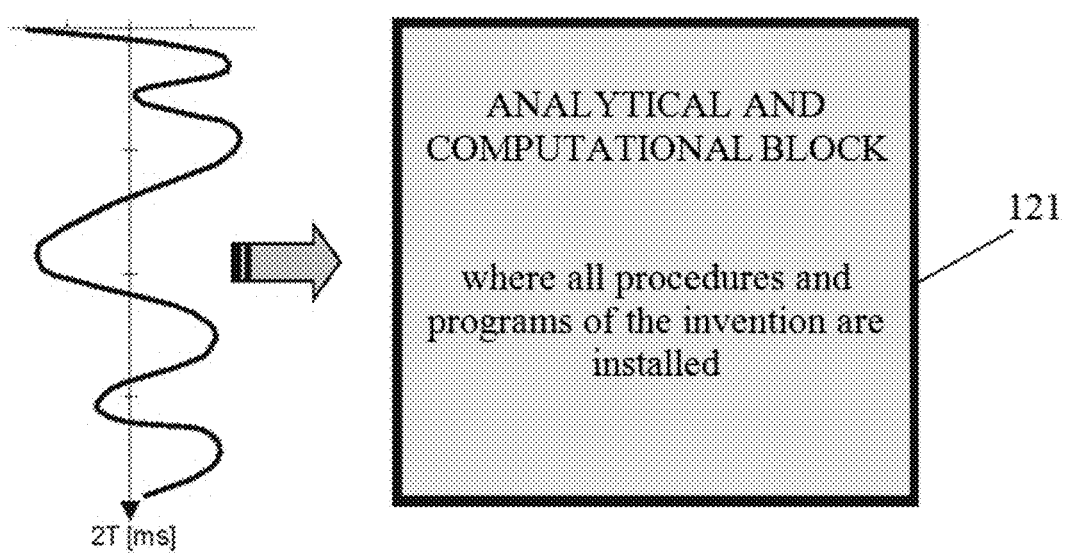
Fig. 4. A curve recorded with the seismic method on the observation surface (=surface of the Earth)

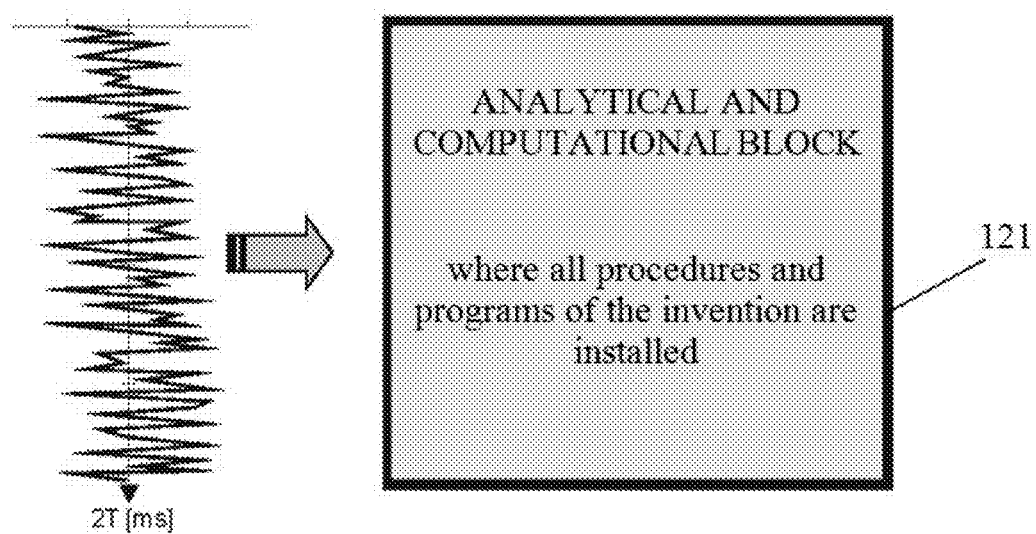
Fig. 5. The curve recorded in borehole

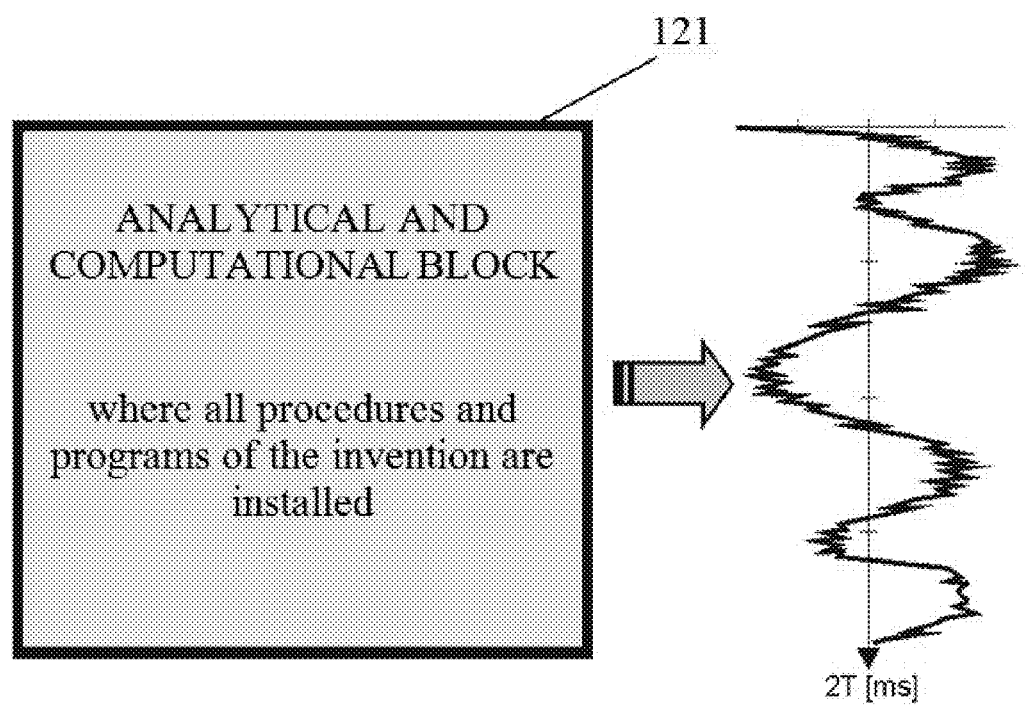
Fig. 6. The curve recorded with the seismic method after application of processes and procedures presented in the analytical and computational block

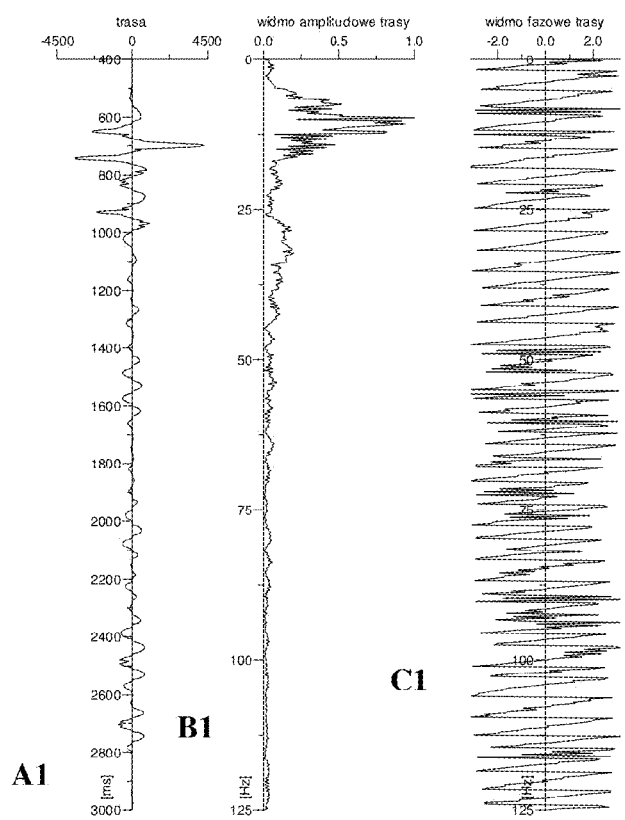
Fig. 7: Seismic Trace A1, Amplitude B1, and Frequency Spectrum C1.
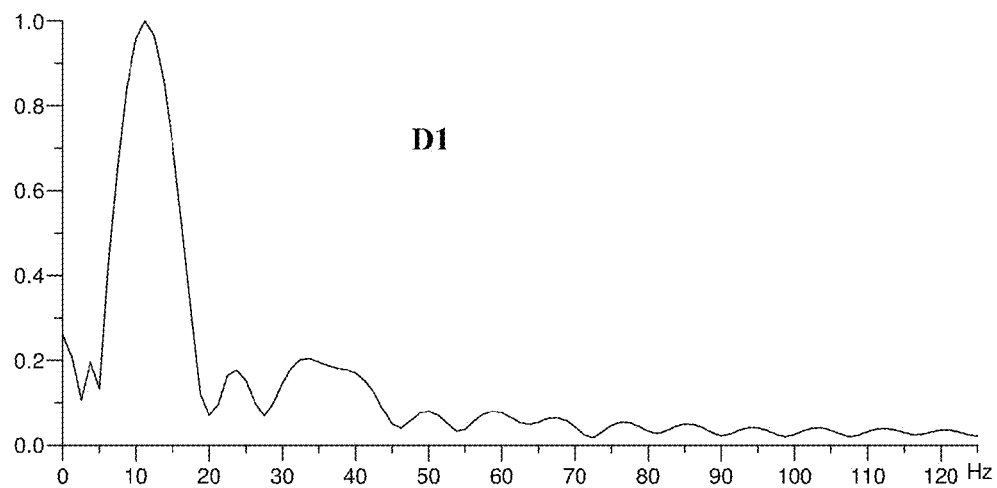
Fig. 8: The smoothened input curve shape D1

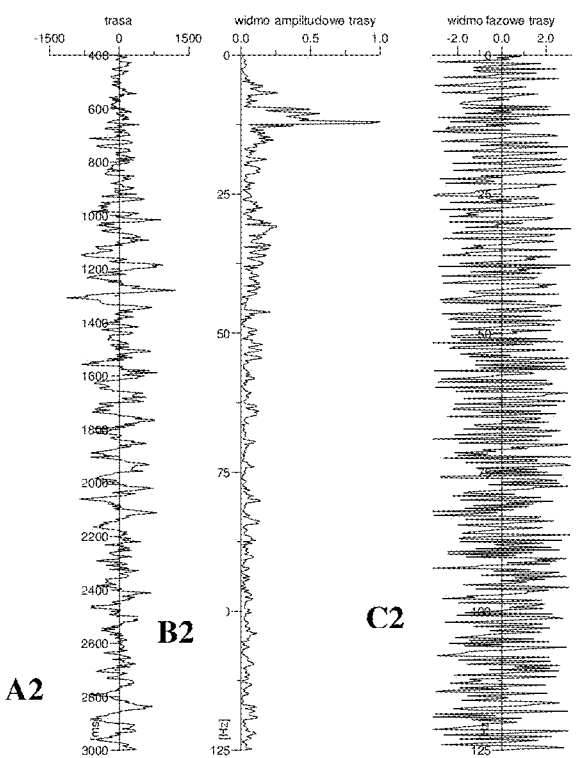
Fig. 9. Seismic Trace A2, Amplitude B2, and Frequency Spectrum C2.
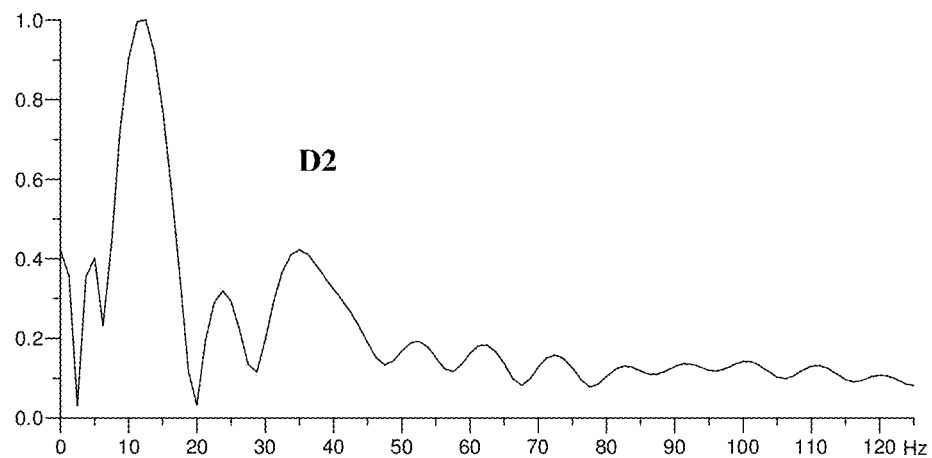
Fig 10: The smoothened output curve shape D2

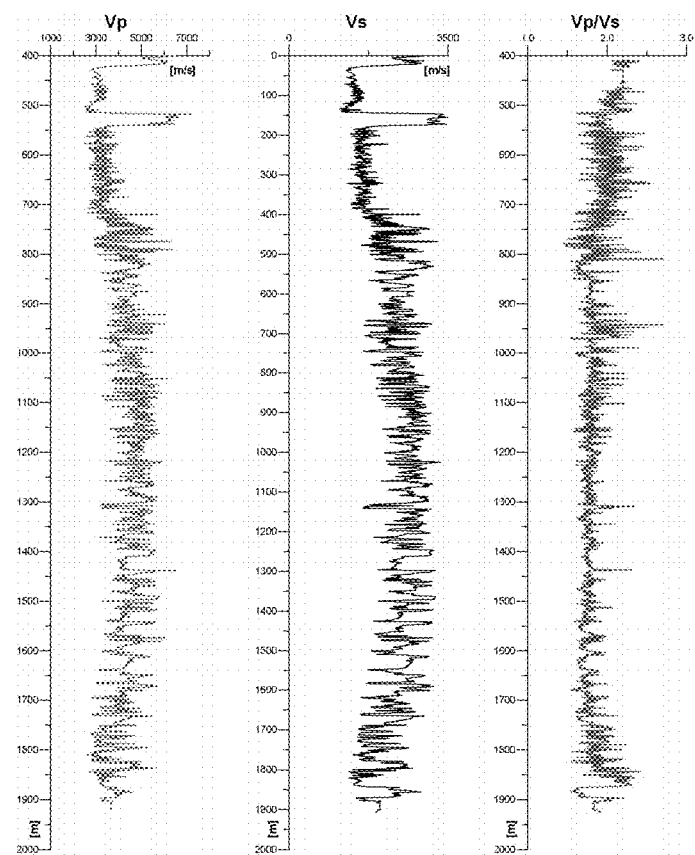
Fig. 11. Results of well logging (Vp, Vs and Vp/Vs)

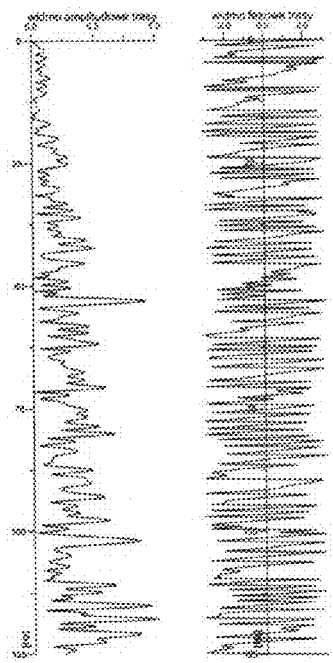
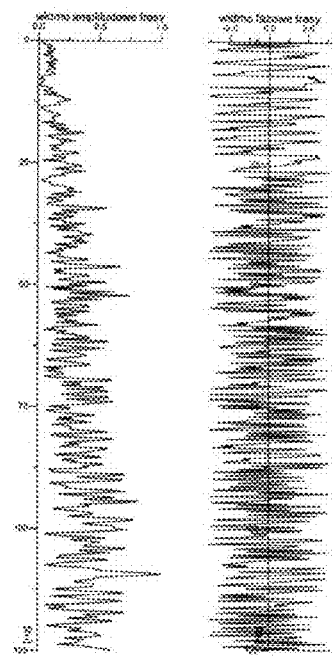
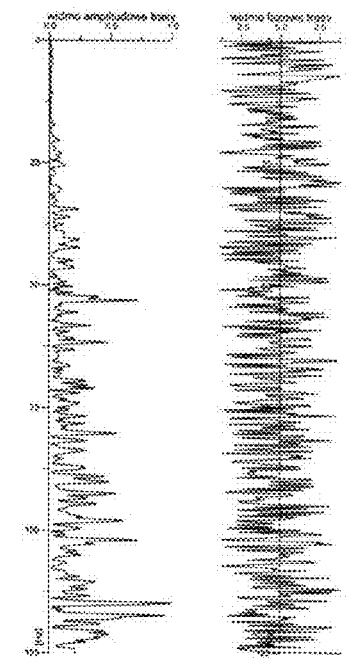
Fig. 12                    Fig. 13                    Fig. 14
Fig. 12  The results of Fourier transform of well login data for acoustic wave
Fig. 13  The results of Fourier transform of well login data for shear wave
Fig. 14  The results of Fourier transform of Vp/Vs relation

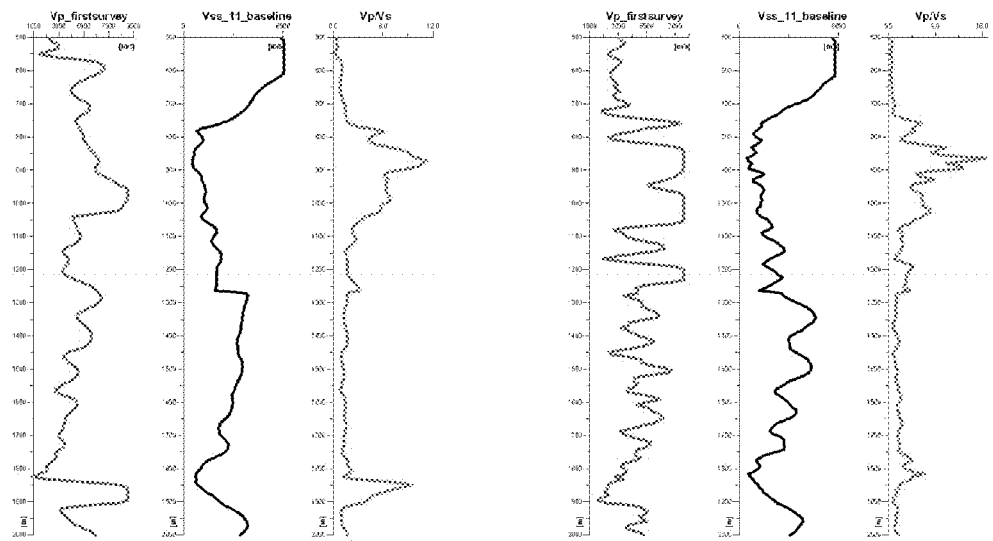
Fig. 15. Vp/Vs peak before modification.   Fig. 16. Vp/Vs peak after modification.
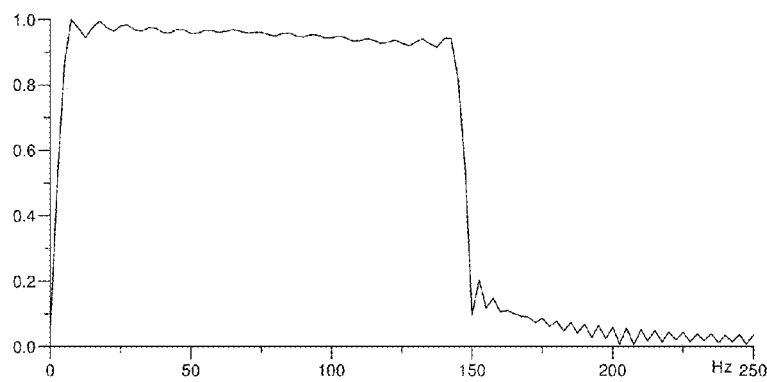
Fig. 17. Predicted shape of amplitude spectrum as the result of the extension of the frequency range to 150 Hz

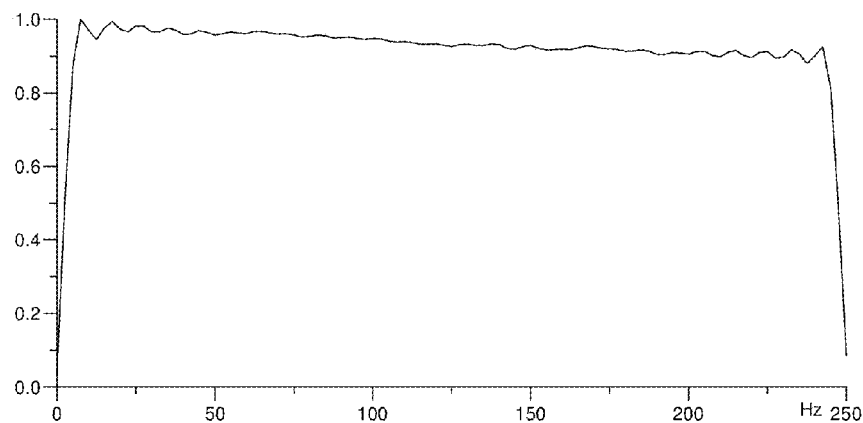
Fig. 18. Predicted shape of amplitude spectrum as the result of the extension of the frequency range to 250 Hz
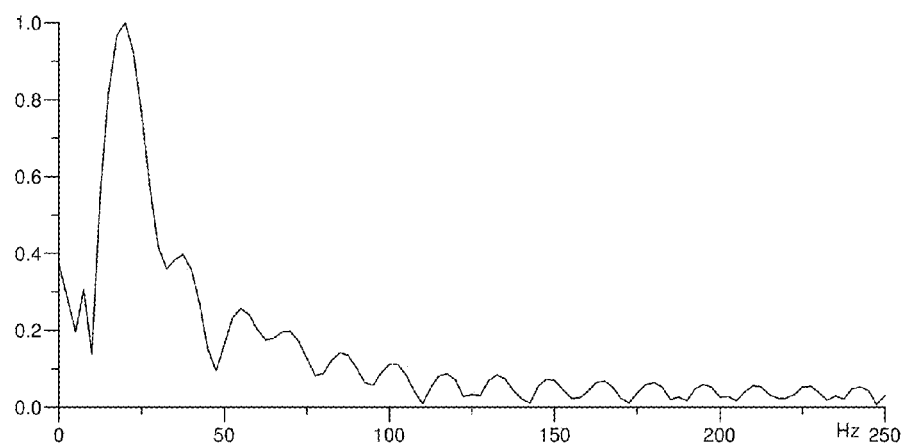
Fig. 19. Predicted shape of amplitude spectrum curve as modified by the predicted amplitude spectrum of fig. 17 and 18

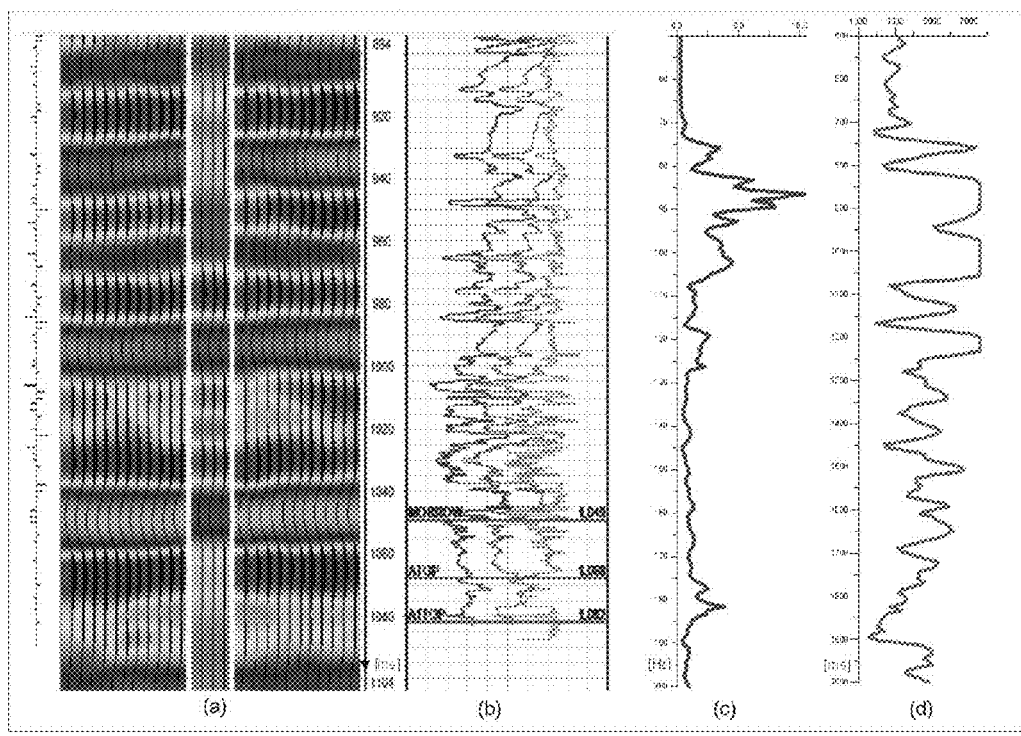
Fig. 20. Input data of the method of modification

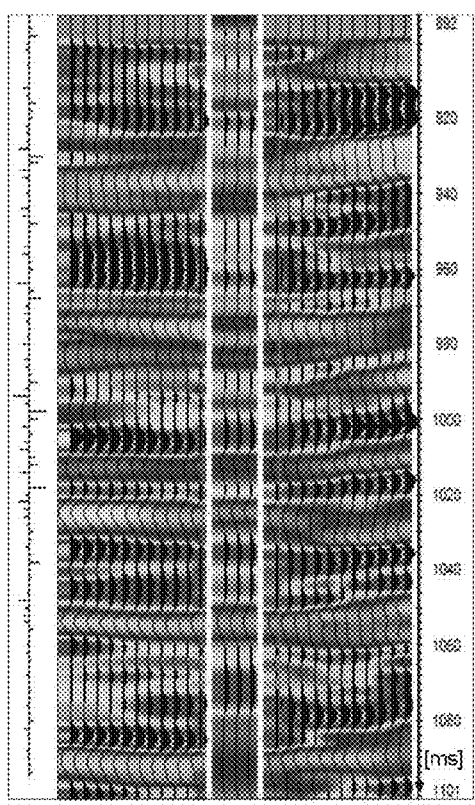
Fig. 21. Output data – wave field as a result of application of the method of spectral modification

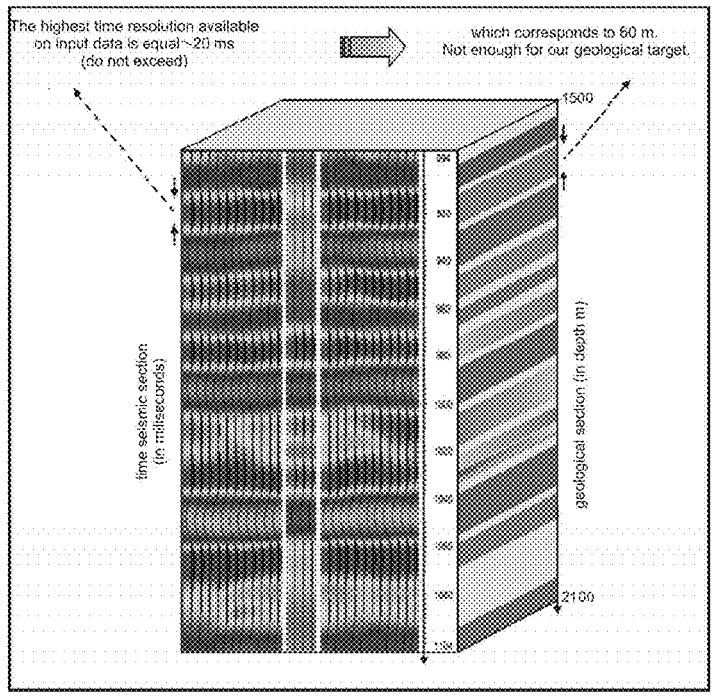
Fig. 22. The cube of seismic data before application of invention procedure
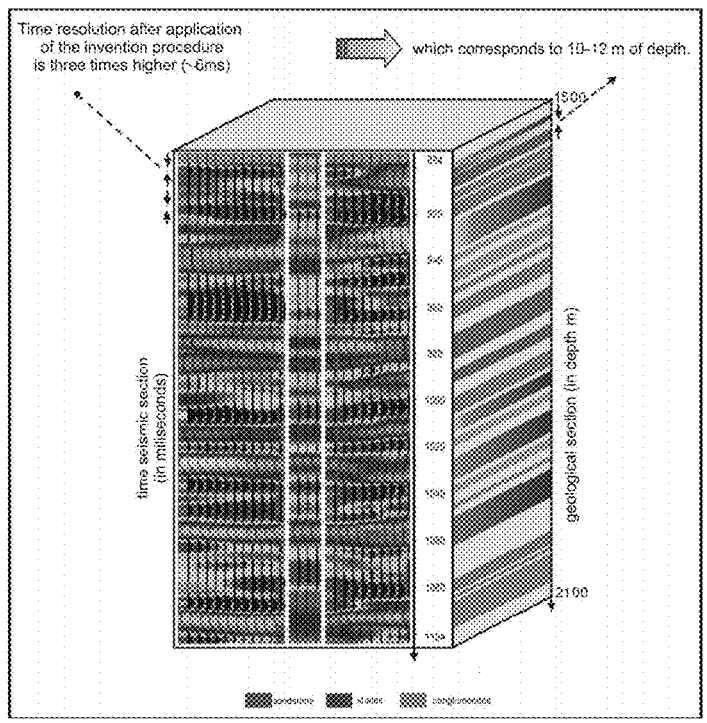
Fig. 23. The cube of seismic data after application of invention procedure

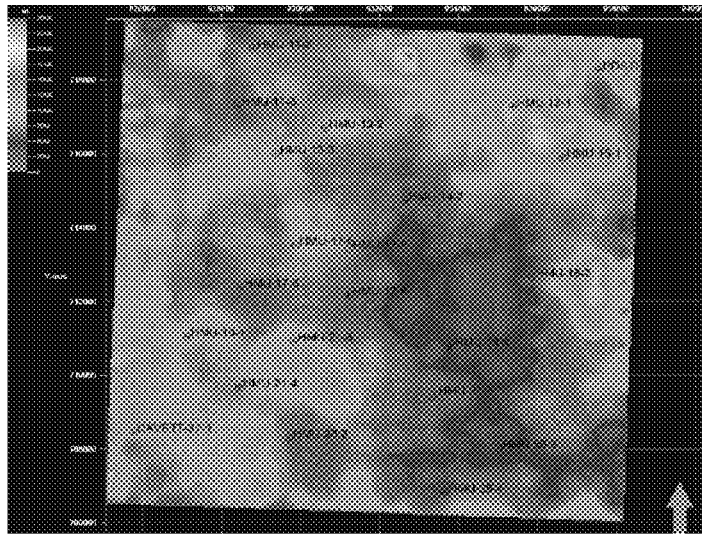
Fig. 24. The map of P-wave velocities as the result of seismic inversion performed on input data (before invention procedures)
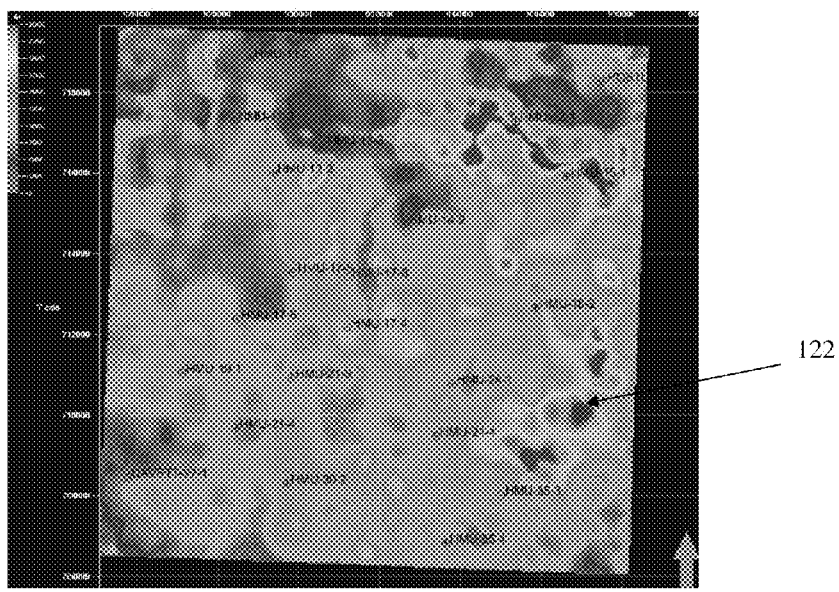
Fig. 25. The map of P-wave velocities as the result of seismic inversion performed on output data (after invention procedures)

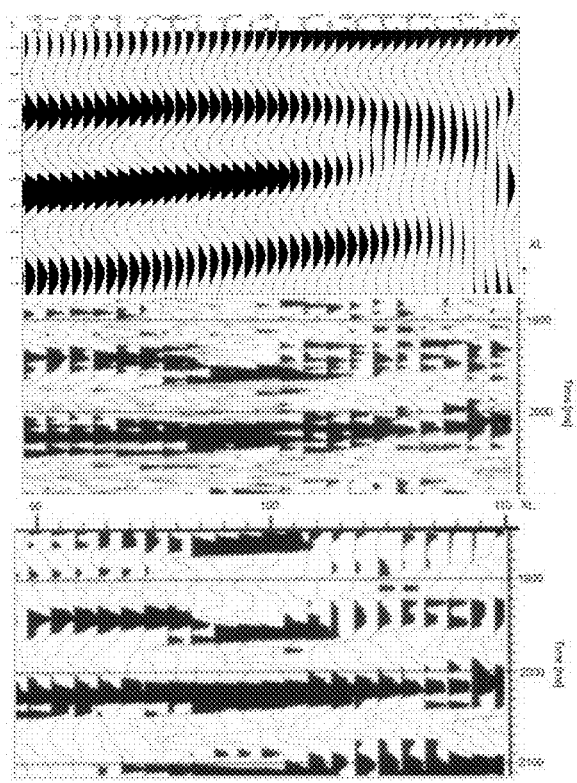
Fig. 26. Shear SS22 wave (a) with P wave reflectivity introduced (b) and after median filtering (c)

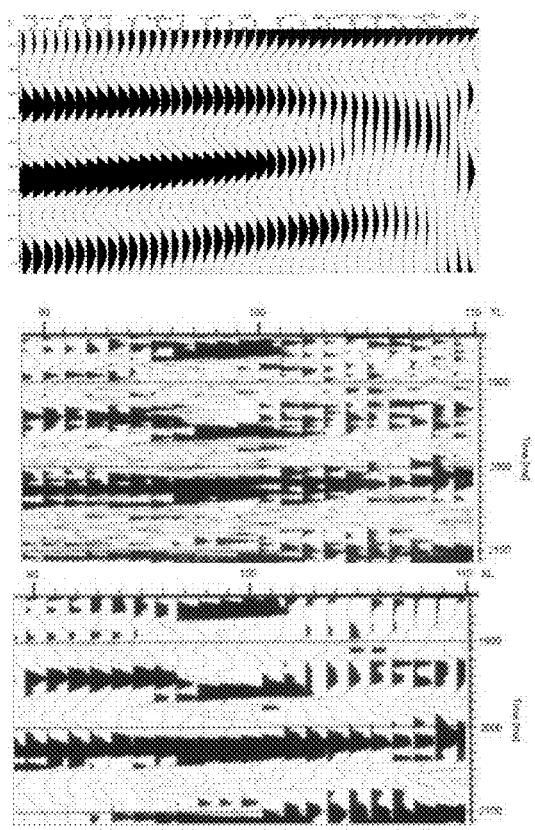
Fig. 27. Shear SS22 wave (a) with P wave reflectivity introduced (b) and after median filtering (c)

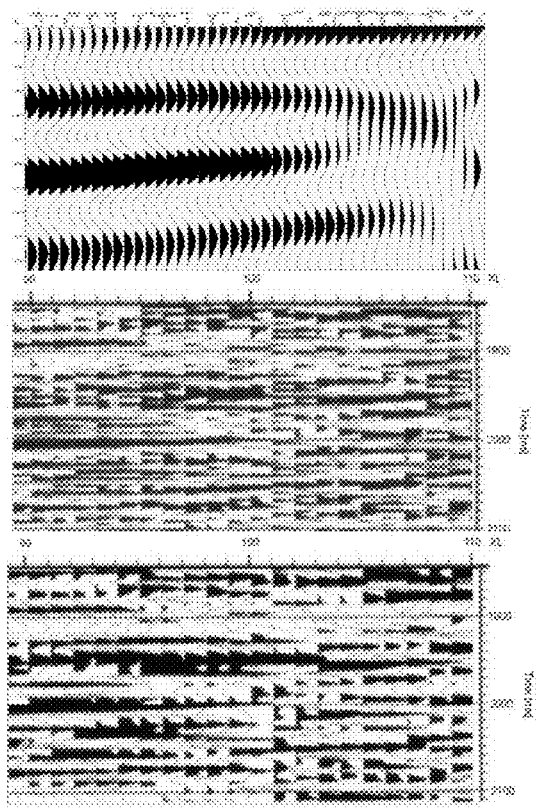
Fig. 28. Shear SS22 wave (a) with (P+S) wave reflectivity introduced (b) and after median filtering (c)

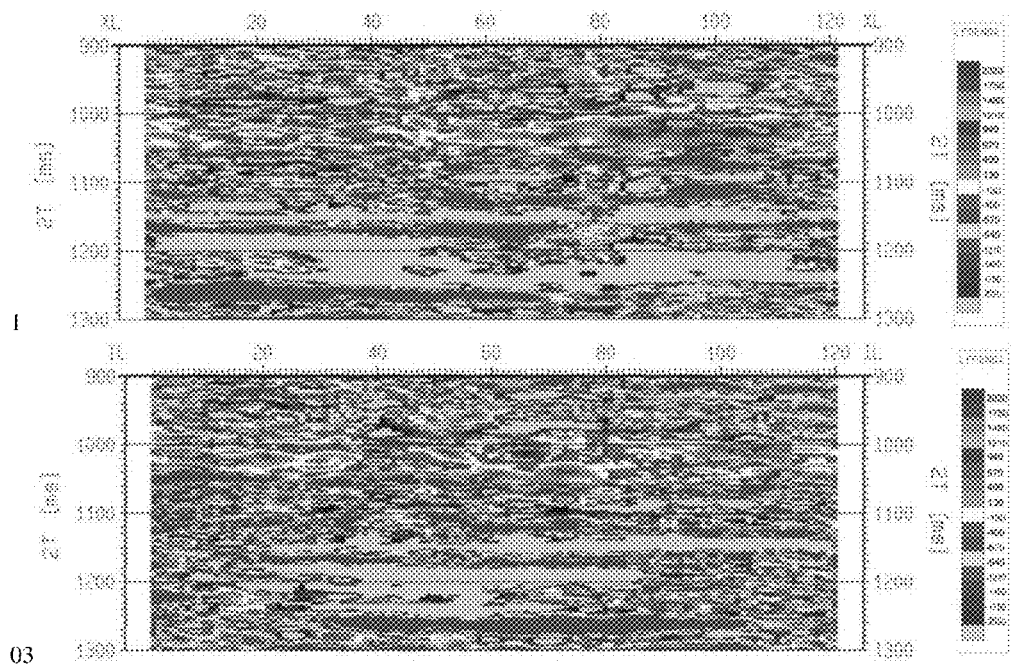
Fig. 29. P wave velocity time section as input data (01) and after invention procedure (03). Reservoir level on PP registration is about 950 ms.

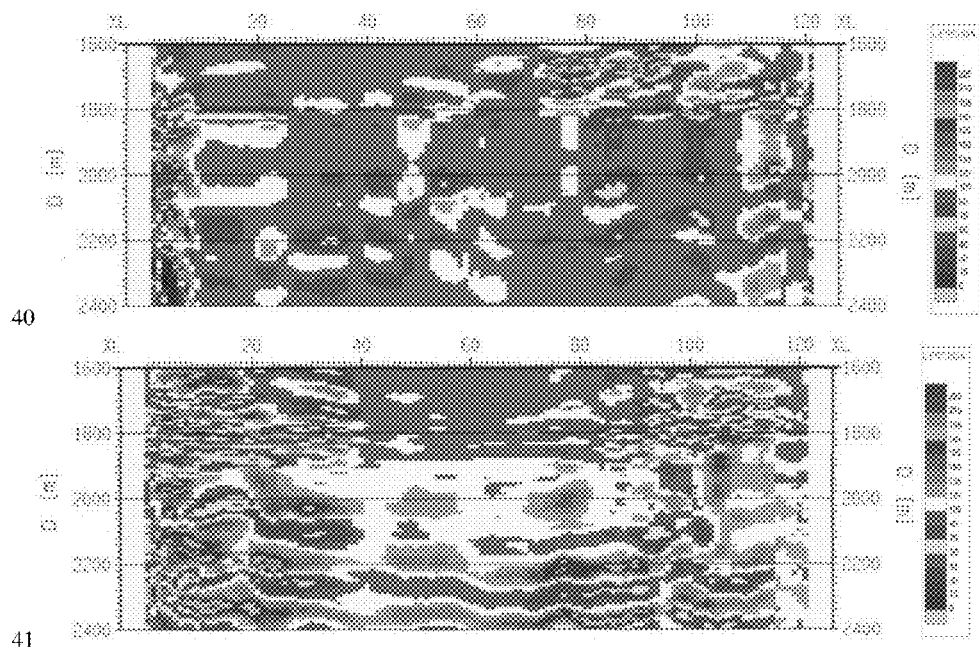
Fig. 30. Shear wave velocity field before (40) and after (41) invention procedure presented in depth domain Reservoir level is about 2240m.

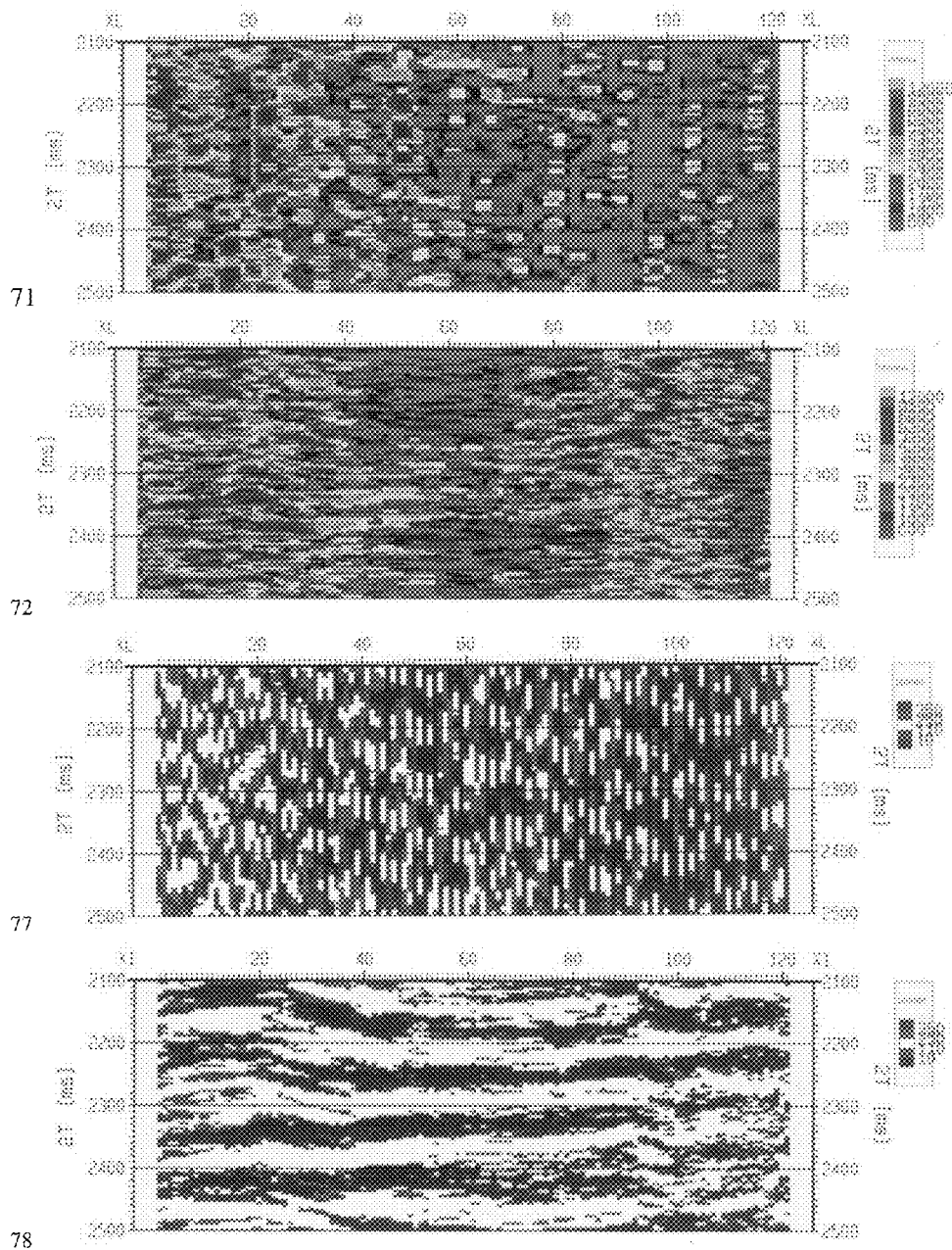
Fig. 31. Instantaneous attributes as the result of Hilbert Transform of shear waves filed before and after proposed invention. Amplitude 71(before) 72 (after) and Phase 77(before) 78 (after)

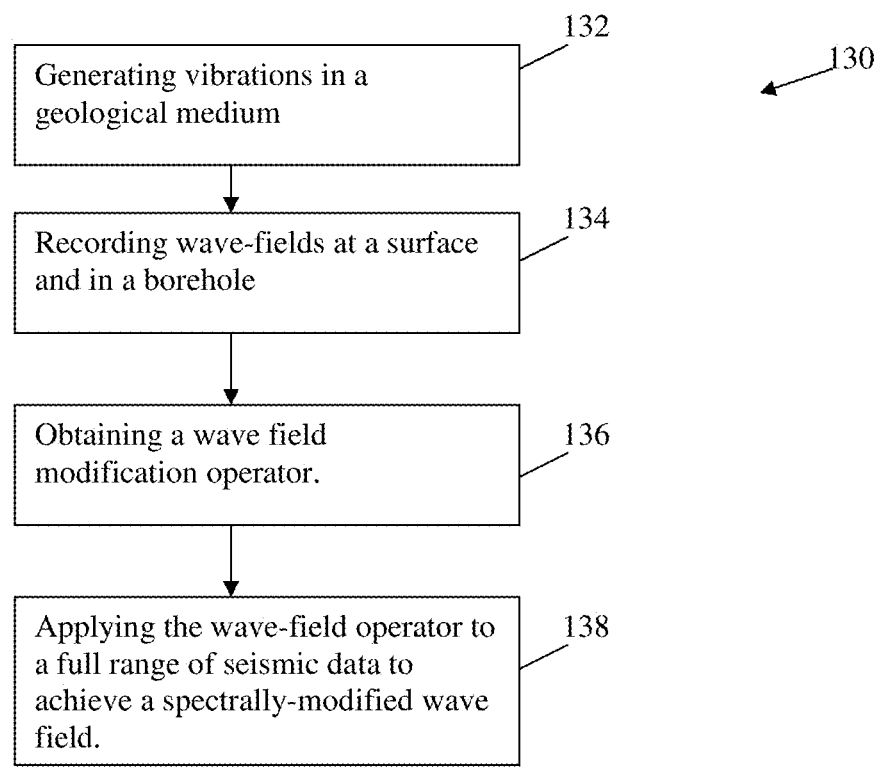
Fig. 32. Flow chart illustrating a method of geological medium exploration

GEOLOGICAL MEDIUM EXPLORATION

CROSS-REFERENCE TO RELATED APPLICATION

This application claims the benefit under 35 U.S.C. §119 (e) to U.S. provisional Application No. 61/593,096, filed Jan. 31, 2012, and entitled "Geological Medium Exploration", the entire disclosure of which is hereby incorporated by reference herein.

BACKGROUND

Various techniques and technologies have been implemented in geological exploration. One technique commonly referred to as the "seismic method" includes generating vibrations in the earth and recording reflected signals. Generally, attempts to improve the seismic methods for geological exploration have been aimed at increasing the resolution of recorded measuring curves. In particular, filtration (in the frequency domain) and deconvolution (in the time domain) were used and based exclusively on the recordings of elastic vibrations made on the surface of the Earth.

Presently, strict requirements and challenges related to the efficiency of the seismic method with new geological targets of exploration (for example, unconventional deposits of shale gas and tight gas) have exposed previously used methods of signal processing/conversion as less effective at locating such targets.

SUMMARY

Systems and methods for geological medium exploration are provided herein. In one embodiment, a method of geological medium exploration includes generating vibrations in a geological medium and recording wavefields at a surface and in a borehole. Additionally, the method includes obtaining a wave field modification operator and applying the wave-field operator to a full range of seismic data to achieve a spectrally-modified wave field.

In another embodiment, a system for geological medium exploration includes a vibration generator and at least one surface vibration sensor and at least one borehole sensor. The system also includes a computing system coupled to the at least one borehole sensor and the at least one surface vibration sensor. The computing system is configured to obtain a wave field modification operator and apply the wave-field operator to a full range of seismic data to achieve a spectrally-modified wave field.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

BRIEF DESCRIPTION OF THE DRAWINGS

FIG. 4 illustrates a curve recorded with the seismic method on the observation surface.

FIG. 5 illustrates a curve recorded in the borehole.

FIG. 6 illustrates the curve of FIG. 4 after modification of the curve in accordance with the present techniques.

FIG. 7 illustrates the input Seismic Trace A1, Amplitude B1, and Frequency Spectrum C1.

FIG. 8 illustrates the input curve shape D1.

FIG. 9 illustrates modified Seismic Trace A2, Amplitude B2, and Frequency Spectrum C2.

FIG. 10 illustrates a modified curve shape D2.

FIG. 11 illustrates results (Vp, Vs and Vp/Vs) of well logging.

FIG. 12 illustrates the results of a Fourier transform performed on well logging data for an acoustic wave.

FIG. 13 illustrates the results of a Fourier transform performed on well logging data for a shear wave.

FIG. 14 illustrates the results of a Fourier transform of the Vp/Vs relation.

FIG. 15 illustrates the Vp/Vs peak before modification.

FIG. 16 illustrates the Vp/Vs peak after modification.

FIG. 17 illustrates the amplitude spectrum.

FIG. 18 illustrates the Frequency spectrum.

FIG. 19 illustrates the output curve as modified by the complex spectrum of FIGS. 17 and 18.

FIG. 20 shows data from actual recordings used as input for the present techniques.

FIG. 21 shows the data of FIG. 20 after application of the method of spectral modification.

FIG. 22 shows different data from actual recordings used as input for the present techniques.

FIG. 23 shows the data of FIG. 22 after spectral modification.

FIG. 24 shows a map of seismic speeds before the application of the method of spectral modification.

FIG. 25 shows the map of seismic speeds of FIG. 24 after application of the method of spectral modification.

FIG. 26 illustrates a (a) Shear SS22 wave (b) with a P wave reflectivity introduced and (c) after median filtering.

FIG. 27 illustrates a (a) Shear SS22 wave (b) with an S wave reflectivity introduced and (c) after median filtering.

FIG. 28 illustrates the (a) Shear SS22 wave (b) with (P+S) wave reflectivity introduced and (c) after median filtering.

FIG. 29 illustrates the P wave velocity time section as input data (01) and after a modification procedure (03). Reservoir level on PP registration is about 950 ms.

FIG. 30 illustrates Shear wave velocity field before (40) and after (41) a modification procedure presented in depth domain Reservoir level is about 2240 m.

FIG. 31 illustrates the result of Hilbert Transform of a shear wave in the time domain. In particular, the Amplitude 71 (before application of the present techniques) and Amplitude 72 (after application of the present techniques) and Phase 77 (before application of the present techniques) and Phase 78 (after application of the present techniques) showing so called "instantaneous attributes" in the time domain. Improvements are clearly visible.

FIG. 32 is a flow chart illustrating a method of geological medium exploration.

DETAILED DESCRIPTION

Figure 1:
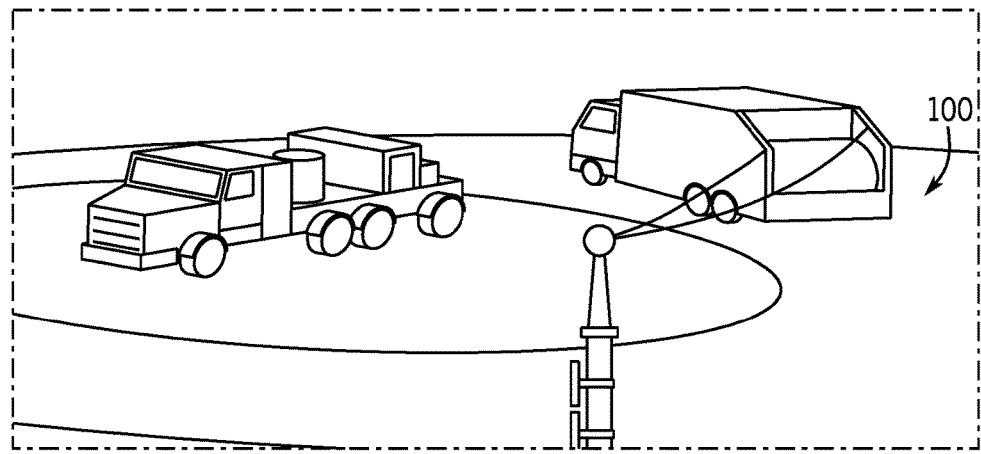
FIG. 1 is an image of a seismic generator and recording system.

Systems and methods for modifying recordings received from seismic measurements are provided. The seismic measurements constitute basic three-dimensional information of the geologic structure of the Earth interior. Generally, the systems and methods increase the resolution of recorded measuring curves which will help to discover much smaller geologic objects and eliminate fading effects of elastic vibration energy proportionate to vibrations propagation relative to the length of the covered route, which directly helps to increase the depth of the seismic wave propagation.

The method of geological medium exploration presented herein uses an additional source of information in the form of measuring curves registered in boreholes, establishing frequency range to facilitate the detailed analysis and the description of the medium. The seismic research method contains three basic elements:

1. Excitation of elastic vibrations in the geologic medium covered by the area of research, for example through detonation of explosives in shallow holes or with the help of mechanical vibrators, and recording these vibrations by electric sensors spaced in specific systems on the surface of the Earth and transferring recorded signals to multi-channel equipment (e.g., installed on movable motor vehicles) where they are converted from analog curves to digital form describing quantitatively the recorded signals.
2. Transformation of recorded signals with the help of digital technology in a highly-specialized analytic and computational center in such a manner that the volume of amplitude of vibrations corresponds to the diversification of physical parameters of the researched medium.
3. Translation of digital information contained in signals into geologic information relating to the structure of the research medium.

In one embodiment, a method of increasing accuracy and depth of geological medium exploration based on registered seismic vibrations is provided. The method includes utilizing the following input data: sequences of amplitudes of seismic elastic vibrations forming seismic routes and borehole particulars, including the medium density and the speed of propagation of seismic waves, in order to establish with the help of the method the route of reflection coefficients. The method includes modification of spectral-response characteristic of registered seismic surface and borehole vibrations. In particular, for a given seismic route x(t) and the route of reflection coefficients $r_c(t)$, the Fourier transformation of the seismic route x(t) and the Fourier transformation of reflection coefficients $r_c(t)$ are calculated and then the amplitude spectrum product and the sum of phase spectra are created, receiving the complex amplitude and phase spectrum, and for this complex spectrum the reverse Fourier transformation (FFT$^{-1}$) is performed, resulting in a time function X(t). This time function, after the Fourier transformation, defines the spectral characteristics of the wave field modification operator in accordance with the formula:

$$X(\overline{\omega})=\int_{-\infty}^{\infty}x(t)e^{-j\overline{\omega}t}dt=A(\overline{\omega})[\cos(\Phi(\overline{\omega}))-j\sin(\Phi(\overline{\omega}))]$$

where:
t—time, $\overline{\omega}$—frequency,
$A(\overline{\omega})$—amplitude spectrum of the route x(t),
$\Phi(\overline{\omega})$—phase spectrum of the route x(t).

The operator $X(\overline{\omega})$ is then applied for the full range of seismic data using a computer program, thus achieving a spectrally-modified wave-field complying with high frequencies present exclusively in the borehole data recordings and directly connected with the thin-bedded structure of the medium and lithofacial variability.

The borehole particulars are determined by the simultaneous recording of the seismic wavefield using an array of seismic sensors in a borehole while conducting the surface seismic recording. This borehole recording 'system' enables us to observe the downgoing and upgoing wavefields especially at or near the reservoir target. In doing so, a "controlled spectrum" is obtained to shape and pull data out of the surface data.

Generally, a seismic trace from may be transposed from the time domain into the frequency domain using the Fourier Transform. The product is an amplitude and a phase spectrum. The goal is to shape the spectra (amplitude and phase) to get the maximum resolution out of the retrieved data without creating artifacts or spurious information. This is where careful, controlled, and reliable operators are needed and where the borehole information can be used. Harmonics come into play as they do in musical instruments and the transmission of sound to shape the spectra.

Figure 2:
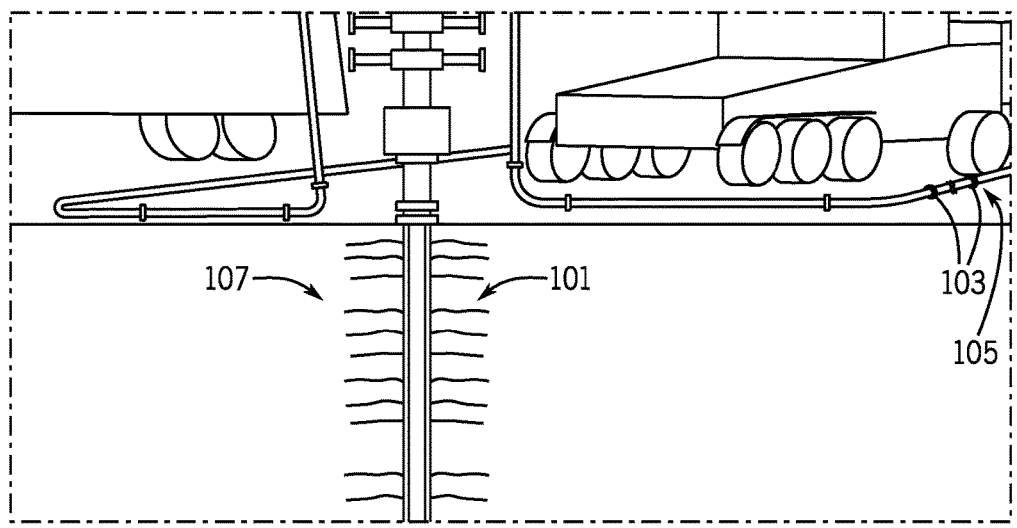
FIG. 2 is a cross-sectional view of geologic layer where wave motion of the rock medium is represented through the seismic recordings.

Turning now to the drawings and referring initially to FIG. 1, an image of a seismic generator and recording system 100 is illustrated. The seismic generator and recording system 100 may be equipped with a localization system such as a global positioning system that is configured to determine the position of the seismic generator. FIG. 2 is a cross-sectional view of geologic layers 101 where wave motion of the rock medium is represented through the seismic recordings. Sensors 103 may be positioned on the surface 105 about the borehole 107, as well as in the borehole.

Figure 3:
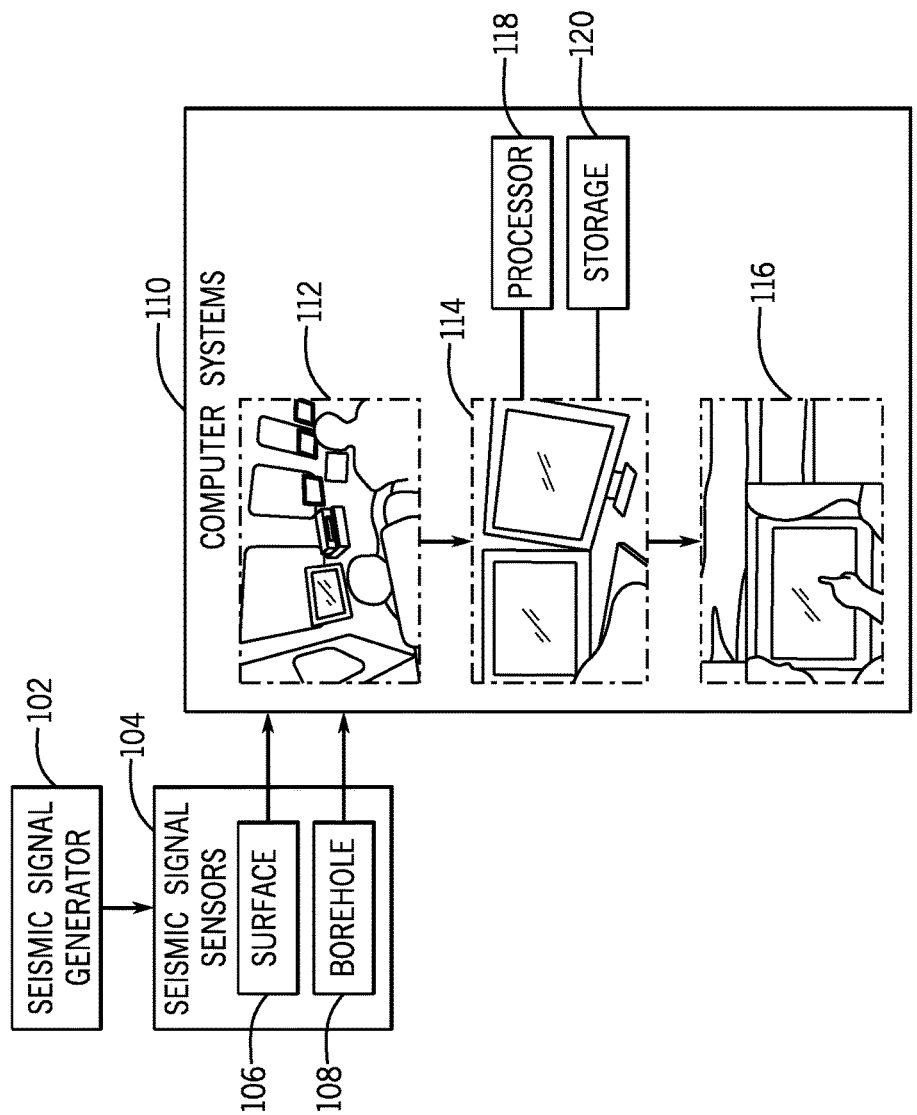
FIG. 3 is a block diagram of the seismic generator and recording system of FIG. 1.

FIG. 3 is a block diagram of the seismic generator and recording system 100. Generally, a seismic signal generator 102 is provided which may include mechanical and/or explosive signal generation modes. In some embodiments, explosives may be detonated down a borehole to generate the seismic signals, while in other embodiments, a mechanical vibrator may be located on the surface to generate the seismic signals.

The reflected seismic signals may be received by seismic sensors 104. The seismic sensors may include one or more sensors located at the surface 106 as well as one or more sensors 108 located in the borehole. The seismic information received at the seismic sensors 104 may be provided to computing systems for recordation, storage, manipulation and analysis. One or more recording channels may operate simultaneously to capture the signals sensed by the sensors 106 and 108. The seismic sensors 104 may be in communication with computer systems 110.

In some embodiments, the computer systems 110 may include multiple computing systems such as an information technology (IT) system 112, which may be configured to control the operation of the seismic generator and recording system 100, a computational center 114, which generally may be configured to manipulate the collected seismic data, and an analysis center 116 which may be configured to facilitate evaluation of the collected and/or manipulated seismic data. In other embodiments, one or more of the computing systems may be combined and/or consolidated into a common computing system. Further, in some embodiments, one or more of the computing systems may be co-located with the seismic generator and recording system 100, while in other embodiments, one or more computing system is located remotely from the seismic generator and recording system. As may be appreciated, each of the computing systems may include one or more processors 118 and non-transient computer readable medium storage 120.

Further, it should be appreciated that the seismic generator and recording system 100 with the computer systems 110 make it possible to take measurements with seismic techniques on shore and off shore, and to transform mechanical vibrations of the ground into seismic recordings used to discover the location of geological deposits.

Generally, the techniques for increasing the accuracy and depth of the geological medium exploration includes modification of spectral-response characteristics of registered seismic vibrations that may be performed in the IT laboratory 112 and the computational center 116. The recording of elastic and seismic vibrations involves many different seismic routes. Depending on the accepted observation pattern (seismicity 2D or 3D) there are thousands of so called seismic routes that are sequences of amplitudes registered in the defined period of time (for example 4 sec) with the accepted, assigned pace of sampling (for example 2 or 4 ms). The process which is taking place in the earth medium and eventually recorded by the system 100 can be described as follows:

> Energy and/or amplitude of vibrations in the earth medium are activated through the detonation of explosives in not deep (20-90 m on average) holes drilled from the surface of the earth or caused by the vibration of the specialized equipment, such as by a VIBRATOR. The vibrations are emitted into the depths of the Earth where, because of the effects of the elastic waves propagation, reflects from the surface of the layers with contrasting mechanical and elastic properties and returns to the surface of the Earth to recording equipment. The time registered is sometimes referred to as "double time" (indicated as 2T [ms]) because it registers the propagation of waves to the reflecting (bouncing) object and back. This energy is recorded by specialized recording machinery as a continuous analog curve or digitally as a sequence of energy values or amplitudes in the specified time of the duration of vibrations with a fixed pace of sampling (in time). These recordings may then be formatted in compliance with the Society of Exploration Geophysics world convention, which facilitates common worldwide information exchange. For such curves, the name "seismic recording in SEG format" has been accepted.

The method of increasing resolution and depth of geologic interpretation presented herein is quite efficient. Standard seismic recording (seismic data), in SEGY format, is transformed to the INTEGE*2 format and then processes and procedures are applied and in particular the procedure of the High Resolution Modification. When a seismic route x(t) and the route of reflection coefficients rc(t) calculated from the boreholes data are obtained, the Fourier transformation of the seismic route x(t) and then the Fourier transformation of reflection coefficients rc(t) are calculated. In the next step, the amplitude spectrum product and the sum of phase spectra are created, receiving the complex amplitude and phase spectra. For this complex spectra, the reverse Fourier transformation is performed which results in a time function. This given Fourier transformation defines the spectral characteristics of the modification operator.

$$X(\overline{\omega}) = \int_{-\infty}^{\infty} x(t) e^{-j\overline{\omega}t} dt = A(\overline{\omega})[\cos(\Phi(\overline{\omega})) - j \sin(\Phi(\overline{\omega}))]$$

where: $A(\omega)$—amplitude spectrum of the route x(t)
$\Phi(\omega)$—phase spectrum of the route elastic wave (xt)

Application of the calculated operator modifies the spectral characteristics of the seismic wave field, complying with frequencies contained in the high resolution recording of Acoustic Surveying, and directly connected with fine-thin-bedded structure of the medium and intertongued lithofaces. Intertongued lithofacies may refer to the variations in rock within a time-stratigraphic unit. Rock fabric will change laterally and vertically in accordance with its formation during deposition. A classic example of facies is a delta where we have a delta plain facies like the Mississippi feeding a delta front and then it goes into deepwater as a prodelta facies. The terms "facies," and "complex stratigraphy," may sometimes be used instead of intertongued lithofacies.

The final seismic recording, being the result of calculations and analyses, has much higher potential for describing and distinguishing geological cross-section relative to input data. In the examples presented below, attention has been focused on the positive aspects of the present technique. In particular, two examples are presented—the first one applies to theoretical model and shows the concept, while the second shows the implementation of the procedure on the concrete field material.

EXAMPLE 1

Demonstration of the Method on Model Data

Data registered on the surface of the Earth, with the help of the seismic method, elastic vibrations of the geologic medium (in time 2T[ms]), are entered into the analytic and computational block 121 as shown in FIG. 4. Analogically, in the analytic and computational block, a curve of acoustic well logging/profiling is recorded (at the depth: H[m]) in the borehole after the previous transformation to the time scale as shown in FIG. 5. As a result of a combination of processes and procedures, we achieve a modified recording of the seismic curve as shown in FIG. 6. A more detailed explanation follows.

Generally, any signal that can be represented as an amplitude that varies with time has a corresponding frequency spectrum. The frequency spectrum of a time-domain signal is a representation of that signal in the frequency domain. The frequency spectrum can be generated via a Fourier transform of the signal, and the resulting values are usually presented as amplitude and phase, both plotted versus frequency.

The Fourier transform of a function produces a frequency spectrum which contains all of the information about the original signal, but in a different form. This means that the original function can be completely reconstructed (synthesized) by an inverse Fourier transform. For perfect reconstruction, a spectrum analyzer preserves both the amplitude and phase of each frequency component. These two pieces of information can be represented as a 2-dimensional vector, as a complex number, or as magnitude (amplitude) and phase in polar coordinates. A common technique in signal processing is to consider the squared amplitude, or power. In this case the resulting plot is referred to as a power spectrum. Because of reversibility, the Fourier transform is called a representation of the function, in terms of frequency instead of time. Thus, it is a frequency domain representation.

When analyzing two different functions simultaneously, the first one done by surface seismics and the second one by borehole seismic (for example acoustic profiling), there are two issues to consider:

1. Because of the different methods of measurement and different scale, a modification of existing spectrum should be estimated/chosen to optimize the resolution and receive the best correlation and consistency between the seismic wave field and the real geological section.
2. To perform what was mentioned above, careful analysis of complex spectrum of seismic data and borehole data is required as discussed below with reference to the drawings.

FIG. 7 shows an ordinary seismic trace A1 (seismic route) in milliseconds with its amplitude B1, and frequency spectrum C1 both in Hertz. FIG. 8 shows the curve shape D1 as an input. For this example, a shear wave may be chosen as more difficult to analyze. Generally, the frequency below 20 Hz is not practically capable of reflecting subtle geological details.

FIG. 9 illustrates a seismic trace A2, its amplitude B2, and frequency spectrum C2 after processing in accordance with the present techniques. FIG. 10 illustrates the modified curve shape D2. As shown, the modification broadens the spectra up to approximately 50 Hz of effective frequency.

One key feature is the possibility to introduce an arbitrary range of frequencies responsible for needed resolution depending on the subsurface geology of the region. This phase calculation is based on analysis of borehole data (acoustic and shear wave) profiling. All of the foregoing is done in the frequency domain after performing a Fast Fourier Transform.

FIG. 11 shows results of well logging. FIGS. 12-14 illustrate the amplitude and phase spectra (e.g., the complex spectrum) for reflectivity function calculated from the acoustic and shear profiling. The position of the strongest peak of the Vp/Vs estimation is then verified and calculated from the seismic data before (FIG. 15) and after (FIG. 16) wave field modification. To prepare the operator of modification, a selection may be made depending on the available seismic data (longitudinal or shear registration) and available borehole data.

The next phase is based on Inverse Fourier Transform (e.g., returning to the time domain). Specifically, corrections made by the foregoing procedures, for example through calculation of $v_p/v_s$ curves, may be compared to collected data. Vp is the velocity of a compressional wave and Vs is the velocity of a shear wave. In some embodiments, only amplitude spectrum for broadening the desired output spectrum may be used. In other embodiments, a complex spectrum (amplitude and frequency function) may be used. In some embodiments, other spectrum can be evaluated based on the corresponding stratigraphy and sedimentology of the region. FIGS. 17 and 18 illustrate a modified complex spectrum (e.g., the amplitude spectrum (FIG. 17) and the Frequency spectrum (FIG. 18), respectively). FIG. 19 illustrates the output curve as modified by the complex spectrum.

EXAMPLE 2

Demonstration of the Method on Industrial Data

In this example, the object on which the method of the spectral characteristics modification is applied is a recording of a wave field from the project seismicity 3D, so it is referred to as a spatial data block. FIG. 20 shows (a) the seismic wave field registered on the surface, (b) curves of acoustic well logging registered in the borehole, (c) spectral characteristics of the modification operator, and (d) modification operator in the time domain. Generally, the recorded wave field and curves of acoustic well logging are entered into the analytical and computational block. There, the operator of spectral modification is calculated in the frequency domain and after the reverse Fourier transformation in time domain.

Results of the execution of spectral modification procedures with use of the calculated operator are shown in FIG. 21. Comparison of the input of the wave field (FIG. 20a)—before the use of the modification method—and output (FIG. 21)—after the application of the modification method—clearly manifests the increase in resolution of the seismic recording, giving the possibility of identification of far more details of the wave picture, translating directly into higher accuracy of the geological interpretation This is additionally shown in FIGS. 22 and 23 which show the result of the transformation of the wave picture recorded during the registration with the seismic method in time domain—into the depth domain, basic for geological interpretation. Specifically, FIG. 22 shows a picture of distinction of geological formations (sands, shales, and conglomerates) before the application of the spectral modification method and FIG. 23 shows a picture of distinction of geologic formations (sands, shales, and conglomerates) after the application of the spectral modification method.

Further, FIGS. 24 and 25 show maps of seismic speeds before and after the application of the method of spectral modification, which generally constitute the final materials for geologic interpretation. In FIG. 25 the appearance of separate elements (e.g., at 122, those marked with the deep black shade) corresponds to the new geologic information, achieved due to the application of the method.

FIGS. 26-28 illustrate another example. FIG. 26 illustrates (a) a Shear SS22 wave (b) with a P wave reflectivity introduced (c) and after median filtering. FIG. 27 illustrates (a) a Shear SS22 wave (b) with a S wave reflectivity introduced (c) and after median filtering. FIG. 28 illustrates (a) the Shear SS22 wave (b) with (P+S) wave reflectivity introduced (c) and after median filtering.

Generally, an improvement of resolution is clearly visible in each instance. Additional filtering results in more continuous reflectors on the image. In collecting the field measurements, two components of shear waves were registered: (1) slow SS11 and (2) fast SS22 depending on the relative orientation of seismic profile (line) to optimize the resolution of the shear wave (SS22) field, the frequency corresponding to the P-wave reflectivity, the frequency corresponding to the S-wave reflectivity, and the frequency corresponding to both the P- and S-wave reflectivity. The input shear wave low frequency field (a) is compared with the shear wave field after introducing the P-wave (or S-wave, or P-and S-wave) frequency (b) and with median filtering (c), in each of FIGS. 26-28.

In each of the foregoing examples, the wave field is modified. The wave field modification is influenced by results of seismic data processing and interpretation. FIGS. 29-31 illustrate the result of a Hilbert Transform on shear waves field (so called instantaneous parameters or seismic attributes). Generally, un-interpretable images of amplitudes and especially frequency parameters calculated on the input data present clear interpretable seismic document seismic section after application of procedure discussed above. The same concerns velocity field in time and depth domain.

FIG. 32 is a flow chart illustrating a method 130 of geological medium exploration. The method 130 includes generating vibrations in a geological medium (Block 132). The vibrations may be generated through any suitable manner including mechanical and/or explosive modes. The method also includes recording wave-fields at a surface and in a borehole (Block 134). The wave-fields generally may be recorded using a multi-channel recorder that receives signals from multiple different sensors. The sensors may be arranged in an array around the seismic generator or in any other suitable pattern. A wave-field modification operator is then obtained (Block 136) and applied to a full range of seismic data to achieve a spectrally-modified wave-field (Block 138). The wave-field operator may be obtained by calculating Fourier transformations of a route seismic route x(t) and a route of reflection coefficients $r_c(t)$, creating an amplitude spectrum product, creating a sum of phase spectra, receiving a complex amplitude and phase spectrum, and performing a reverse Fourier transformation on the complex spectrum to create a time function X(t).

One of the advantages of the foregoing is the ability to transform the seismic wavefield into highly accurate velocity information. This information helps transform the time measured data into accurate models in depth. It also provides better and more accurate information on rock and fluid characteristics in the subsurface and our ability to see fluids move with time, i.e., time-lapse. This further helps to improve reservoir characterization.

The foregoing discussion describes some example embodiments for improving geological medium exploration. Although the foregoing discussion has presented specific embodiments, persons skilled in the art will recognize that changes may be made in form and detail without departing from the spirit and scope of the embodiments. Accordingly, the specific embodiments described herein should be understood as examples and not limiting the scope of the disclosure.

The invention claimed is:

1. A method of geological medium exploration comprising:
generating vibrations in a geological medium;
recording wave-fields at a surface;
obtaining borehole spectral characteristics;
calculating a wave-field modification operator based at least in part on the recorded wave-fields and borehole spectral characteristics; and
applying the wave-field modification operator to a full range of seismic data to achieve a spectrally-modified wave field, wherein calculating the wave-field modification operator comprises:
calculating a Fourier transformation of a seismic route x(t);
calculating a Fourier transformation of a route of reflection coefficients $r_c(t)$;
creating an amplitude spectrum product;
creating a sum of phase spectra;
receiving a complex amplitude and phase spectrum; and
performing a reverse Fourier transformation on the complex spectrum to create a time function X(t).

2. The method of claim 1, wherein the time function X(t) defines the spectral characteristics of the wave field modification operator in the form of $$X(\overline{\omega})=\int_{-\infty}^{\infty}x(t)e^{-j\overline{\omega}t}dt=A(\overline{\omega})[\cos(\Phi(\overline{\omega}))-j\sin(\Phi)(\overline{\omega}))]$$

where: $A(\omega)$—amplitude spectrum of the route x(t)
$\Phi(\omega)$—phase spectrum of the route elastic wave (xt).

3. The method of claim 1, wherein the wave field modification operator is based on at least the full spectrum of seismic data and well-log data for the borehole.

4. The method of claim 1, wherein the borehole spectral characteristics comprise at least one of medium density, wave propagation speed, and reflection coefficients of the borehole.

5. The method of claim 4, wherein the borehole spectral characteristics comprise an acoustic survey of the borehole.

6. The method of claim 4, wherein the borehole spectral characteristics are obtained using at least one borehole sensor.

7. The method of claim 4, wherein the borehole spectral characteristics are previously recorded.

8. The method of claim 1, wherein applying the wave-field modification operator comprises calculating an amplitude spectrum product from the full range of seismic data and the borehole spectral characteristics.

9. The method of claim 1, wherein the resolution of the spectrally-modified wave-field is greater than the wave-fields recorded at the surface.

10. A system for enhancing geological seismic data comprising:
a computing system configured to:
obtain well log data of at least one borehole;
obtain reflected seismic data;
calculate a wave-field modification operator by
calculating a Fourier transformation of a seismic route x(t);
calculating a Fourier transformation of a route of reflection coefficients $r_c(t)$;
creating an amplitude spectrum product;
creating a sum of phase spectra;
receiving a complex amplitude and phase spectrum; and
performing a reverse Fourier transformation on the complex spectrum to create a time function X(t) based at least in part on the spectral characteristics of the at least one borehole; and
apply the wave-field operator to a full range of seismic data to achieve a spectrally-modified wave field;
wherein the computing system increases the resolution of the full range of seismic data.

11. The system of claim 10, wherein the computing system comprises multiple discrete computing systems.

12. The system of claim 10, wherein the wave field modification operator is based on at least the full spectrum of seismic data and well-log data for the borehole.

13. The system of claim 10, wherein the time function X(t) defines the spectral characteristics of the wave field modification operator in the form of $$X(\overline{\omega})=\int_{-\infty}^{\infty}x(t)e^{-\overline{\omega}t}dt=A(\overline{\omega})[\cos(\Phi(\overline{\omega}))-j\sin(\Phi(\overline{\omega}))]$$

where: $A(\omega)$—amplitude spectrum of the route x(t)
$\Phi(\omega)$—phase spectrum of the route elastic wave (xt).

14. A method of geological medium exploration comprising:
generating vibrations in a geological medium;
recording wave-fields at a surface and in a borehole;
obtaining a wave field modification operator; and
applying the wave-field operator to a full range of seismic data to achieve a spectrally-modified wave field;
wherein obtaining the wave-field modification operator comprises:
calculating a Fourier transformation of a seismic route x(t);
calculating a Fourier transformation of a route of reflection coefficients $r_c(t)$;
creating an amplitude spectrum product;
creating a sum of phase spectra;
receiving a complex amplitude and phase spectrum; and
performing a reverse Fourier transformation on the complex spectrum to create a time function X(t).

15. The method of claim 14, wherein the time function X(t) defines the spectral characteristics of the wave field modification operator in the form of $$X(\overline{\omega})=\int_{-\infty}^{28}x(t)\,e^{-j\overline{\omega}t}dt=A(\overline{\omega})[\cos(101\,(\overline{\omega}))-j\sin(101\,(\overline{\omega}))]$$

where: $A(\overline{\omega})$—amplitude spectrum of the route x(t)
$\Phi(\overline{\omega})$—phase spectrum of the route elastic wave (xt).

* * * * *